Oct. 30, 1962 R. E. LEWIS ETAL 3,060,806
IMAGE FORMING ELEMENT
Filed May 4, 1959 2 Sheets-Sheet 1

ROBERT E. LEWIS
ROBERT J. MELTZER
INVENTORS

BY Frank C. Parker
B. A. Chiama
ATTORNEYS

Oct. 30, 1962  R. E. LEWIS ETAL  3,060,806
IMAGE FORMING ELEMENT
Filed May 4, 1959  2 Sheets-Sheet 2

ROBERT E. LEWIS
ROBERT J. MELTZER
INVENTORS

BY Frank C. Parker
B.A. Chiama
ATTORNEYS

United States Patent Office 3,060,806
Patented Oct. 30, 1962

3,060,806
IMAGE FORMING ELEMENT
Robert E. Lewis, Rochester, and Robert J. Meltzer, Irondequoit, N.Y., assignors to Bausch & Lomb Incorporated, a corporation of New York
Filed May 4, 1959, Ser. No. 810,815
4 Claims. (Cl. 88—57)

The present invention relates to optical image forming devices and more particularly to optical means for forming an image of a sheet of copy and transmitting the image to another sheet upon which the copy is to be duplicated.

The present invention is particularly adapted for copy machines wherein the material to receive the copy is sensitive to light, such as diazo material, and the material to be copied is imprinted upon material which is opaque to light or unsuited to transmission printing. In the diazo reaction or blueprinting processes, the transferring of an image is direct, that is, the sensitive surface is held in contact with the master and a light is positioned behind the master so that light rays are formed through the master. For good results, the original text to be copied must be a strong black on white and the master paper must be reasonably translucent. If the text is on opaque paper or other material impervious to light or if translucent but printed on both sides, the diazo reaction or blueprinting processes cannot be utilized. Therefore, it is the principal object of the present invention to provide an image forming device which will permit the transferring of an image from a text having an opaque backing to photosensitive paper.

Another object of the invention is to transfer images from one surface to another surface while maintaining high resolution and efficient light transfer.

Other objects and advantages will become apparent to those skilled in the art from the following specification taken in conjunction with the accompanying drawings, wherein.

Figure 1:
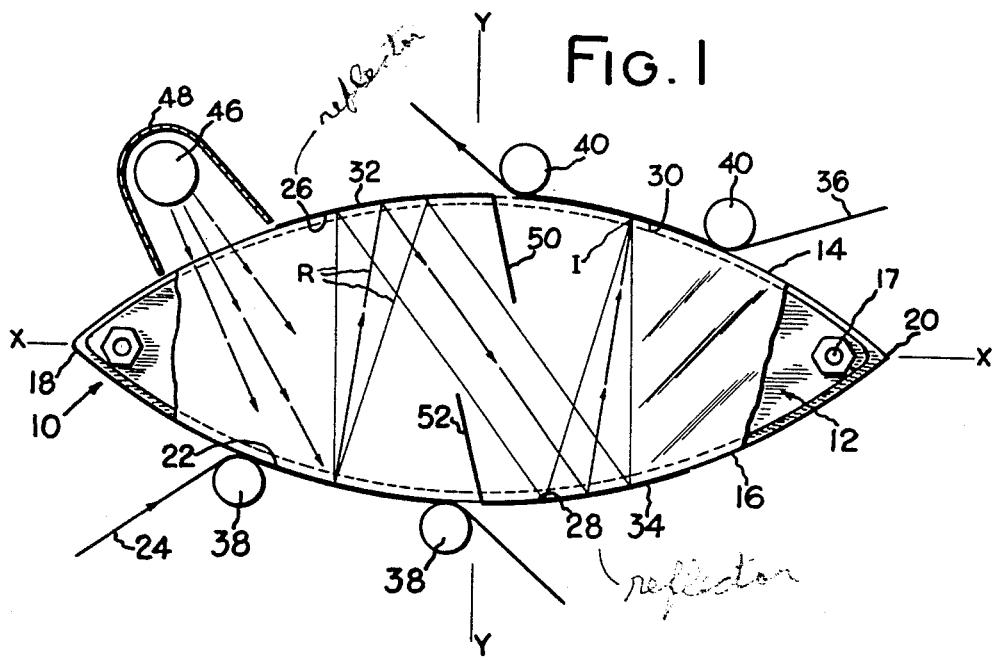
FIG. 1 is an elevational view of the image forming device of the present invention shown in position of operation.
Figure 2:
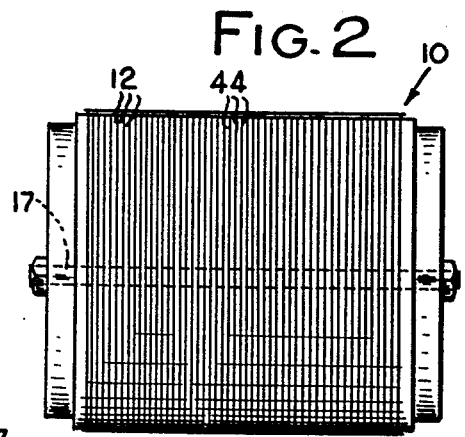
FIG. 2 is an end view of the image forming element showing the laminations in stacked arrangement.
Figure 3:
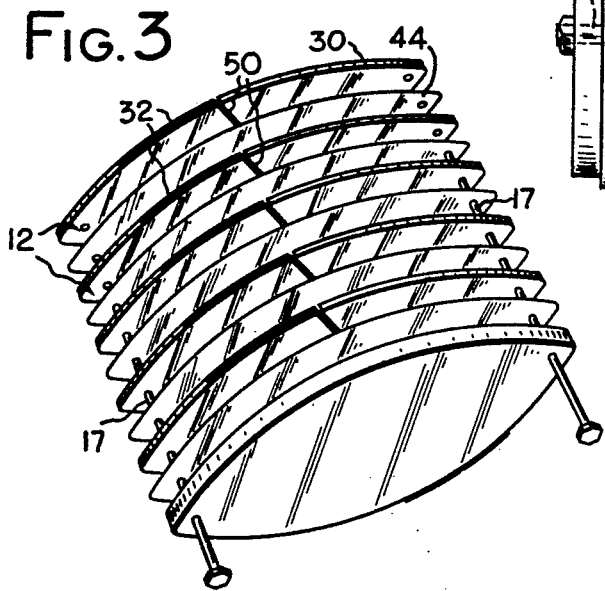
FIG. 3 is an exploded view of some of the laminations of the image forming element.

Referring now to FIGS. 1–3 for the preferred embodiment of the invention, there is shown a stacked or laminar optical element 10 comprising a plurality of thin, transparent laminations 12 formed with two curved edge surfaces 14, 16 having the same radius of curvature. The laminations may be made of glass or clear methyl methacrylate resin or any other suitable transparent material and are maintained in a stacked relationship by suitable tie rods 17 projecting through openings formed at the extreme ends of the laminations. As illustrated in FIG. 1, one extreme end of the upper edge surface 14 joins one extreme end of the lower edge surface 16 at a point 18. Similarly, the other end of the edge surface 14 joins the other end of the lower edge surface 16 at a point 20, thus completing the general outline of a lamination. The edge surfaces 14, 16 are cylindrical and are symmetrically arranged on either side of the long axis X—X while the points 18, 20 are symmetrically disposed on either side of the short axis Y—Y.

The edge surface 16 of each lamination 12 has a polished surface portion 22 in the case of glass intermediate the short axis Y—Y and the end point 18 which serves as an image receiving entry surface for an elemental area P of an object imprinted upon a master sheet or roll denoted by the numeral 24. As illustrated by the ray traces R, the image forming light rays are transmitted through the laminations and are reflected by a polished curved image forming surface portion 26 of the edge surface 14 located intermediate the axis Y—Y and the end point 18. The light rays thus reflected are directed to a second polished curved image forming surface portion 28 of the edge surface 16 located intermediate the Y—Y axis and the end point 20. The light rays impinging upon the portion 28 are again reflected back across the lamination to another polished surface portion 30 of the edge surface also located intermediate the short axis Y—Y and the end point 20. Suitable material 32, 34 such as thin layers of magnesium fluoride, metallic foil or sputtered metal may be applied to the surface portions 26, 28, respectively, in order to effect reflection by these surface portions. In effect, the surface portions 26, 28 are convergent focusing reflectors for the image forming light rays, and serve to image a light pattern from the entrance surface 22 to the exit surface 30.

The curvature of the surface portions 26, 28 is such as to image the elemental area P at the point I on the surface portion 28 whereupon a copy roll or sheet 36 positioned upon the surface portion will be adapted to receive the image light rays thus projected. Because of the symmetry of the laminations, there is no magnification of the elemental object P, that is, there is one to one transmission. Suitable rollers 38 positioned at either end of the surface portion 22 and closely adjacent thereto serve to control and guide the master 24 in a curved path along the portion 22. Drive means (not shown) may be utilized to slide the master across this surface in the direction of the arrow. Similarly, rollers 40 positioned at either end of the surface portion 30 and closely adjacent thereto serve to control and guide the copy sheet in a curved path along the portion 30. Another drive means (not shown) may be utilized to slide the copy sheet across this surface in the direction of the arrow. It will be noted that the direction of movement of the master and the copy sheet are in opposite directions. The copy sheet may be of the sensitive type such as utilized in the diazo reaction or blue-printing processes. It is envisioned in the present invention that the master and the copy sheet may be moved simultaneously in the respective direction thereby permitting copying of relatively large areas of text material on the master.

Each of the laminations 12 is in effect an optical lens capable of image forming only in the plane of the lamination. Image formation is accomplished entirely by the reflections as determined by the edge surface portions 26, 28 and is independent of index of refraction of the material except for the effect of the material on the numerical aperture. Each of the laminations is bounded by two plane surfaces 42, 42 which are ground and polished in the case of glass laminations or, in the case of plastic, would be normally cast in the polished condition. With these surfaces being polished image forming light rays entering the entry edge surface 22 will be transmitted through the lamination my multiple internal reflections by the reflecting surfaces 42, 42.

The laminations 12 must be optically separated from one another in order to maintain their laminar characteristics and separators 44 positioned between the laminations may serve this purpose. The separators may be formed from metallic foil such as aluminum foil, however, other substances may readily lend themselves for this purpose. Metallic separators of aluminum and silver may be applied to each of the plane surfaces 32 by a sputtering process and thus serve as separators. Another very good arrangement for insuring adequate internal reflection is the application on each of the surfaces 32, 32 of layers of magnesium fluoride having an index of refraction lower than any of the segments. Air spaces between the laminations may also be used for separation purposes.

Figure 4:
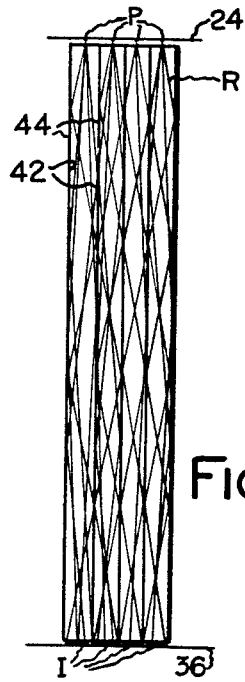
FIG. 4 is a sectional view of some of the laminations showing typical image forming ray traces therethrough.

In FIG. 4, the light rays R are shown as indicating typical paths of some of the light rays as they form an image. It will be noted that transmission is effected by reflection of the light rays by the reflective surfaces 42. Upon emerging from the exit surface 30, the image I will be in the form of a line, the length of which is equal approximately to the thickness of a lamination. This phenomenon will occur regardless of the shape of the elemental object P. It is important then that the thickness of the laminations be extremely small in order to permit minute dissection of the smallest elemental objects possible while at the same time reducing the length of the elemental line images. In practice, the resolution for the optical element 10 is inversely proportional to the thickness of the individual laminations. When viewing a large object, each of the laminations is adapted to dissect the object area and transmit an elemental area of that portion of the object in line with the entry edge surface 22. In turn, the line image emanating from the exit surface 30 forms a composite image of the object which will comprise overlapping line images. When using laminations having very small thicknesses say on the order of 250 microns, the line image will actually appear as points similar to the elemental object which is being viewed.

Each individual lamination 12 is capable of imaging only in one plane and imaging in the plane normal to the planes of the laminations is accomplished by the restriction of the imaging rays to paths within the separate laminae, thereby resulting in the formation of an image of the entire object to be viewed. In the plane of imaging, each lamination is capable of producing the exact dimension of the portion of the object facing the entry portion 22 and in the plane of the lamination, and with the lamination extremely thin, the dimension of the elemental portion of the object viewed by each lamination in the plane transverse to the lamination is extremely small. When a plurality of laminations are stacked to form the optical element 10 as shown in FIG. 1, the curved edge surfaces 14, 16 define cylindrical surfaces, respectively. Each of the surfaces 14, 16 is curved in a plane which is parallel to the planes of the parallel surfaces 42 or to the medial plane of the lamination itself. While the edges 14, 16 are preferably cylindrical, the object or image edge surfaces 22, 30 may assume other contours or curvatures in order to adjust for aberrations.

To illuminate the object, a light source 46 is provided along one of the sides of the element 10 adjacent the edges 14. A shield 48 serves to confine the light only to the lower end of the element 10 so as not to, in any way, affect the image receiving medium 36 adjacent the exit surface 30. Light from the source 46 will be transmitted through the adjacent side of the element 10 and impinge upon the object medium 24 and thence be reflected upwardly in the form of image forming light rays which travel through the laminations as aforesaid. The object medium or master 24 may be transparent or opaque since only reflected light from the master 24 is used for forming the image at the image surface 30.

Each of the laminations 12 is formed with a pair of opposed inwardly directed slots 50, 52 which begin at points adjacent the intersection of the Y—Y axis with the edges 14, 16, respectively. The slot 50 is inclined toward the end point 20 and extends a distance approximately equal to one-third the width of the laminations at this point. Similarly, the slot 52 is inclined toward the end point 18 and is equal in length to the slot 50. Suitable opaque material may be inserted in these slots to prevent the transmission of light therethrough. With this arrangement, the slots 50, 52 serve as diaphragms or aperture stops for the light rays transmitted through the laminations.

The other edge surfaces of each of the laminations, that is, surfaces other than the surfaces 22, 26, 28 and 30 may be coated with a suitable optically opaque material, or the entire image forming element 10, except for the entry and exit edge surfaces, may be encased in a light-tight box. This will prevent extraneous light from entering the sides of the element 10 and reducing the contrast.

In operation, a typical arrangement is shown in FIG. 1, wherein the optical element 10 is in image transferring position relative to a master roll or sheet of material 24 having the copy to be duplicated and a roll or sheet of light sensitive material 36. The element 10 may be of any suitable length which will be determined by the number of laminations 12 utilized and the thickness of each. It will be obvious that the element 10 should be as long as the text to be copied is wide. For purposes of illustration, the rolls or sheets 24, 26 are shown as continually moving mediums in keeping with the usual practice of the diazo reaction and blueprinting processes. The rollers 38 are arranged below the element 10 for controlling and guiding the movement of the master sheet 24 across the entry surface 22 of the element 10. Means (not shown) may be utilized to draw the sheet 38 in the direction of the arrow. Similarly, rollers 40 may be utilized for controlling and guiding the movement of the copy sheet 36 across the exit surface 30 of the element 10. Since imaging is accomplshed by reflection and only in a single dimension per lamination, the image will be inverted in the direction parallel to the laminations, but not in the direction perpendicular to the laminations.

Figure 5:
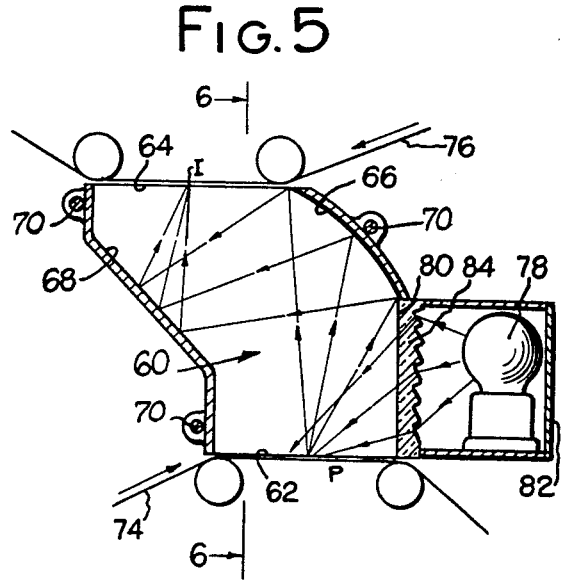
FIG. 5 is a sectional view of a modification of the image forming device.
Figure 7:
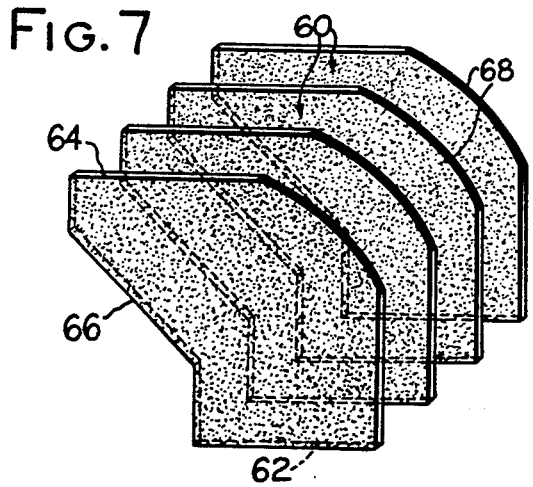
FIG. 7 is a perspective view of some of the laminations for the embodiment of FIG. 5.
Figure 6:
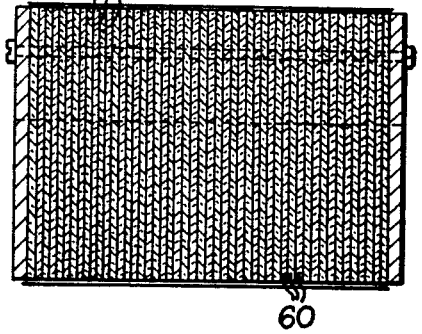
FIG. 6 is a sectional view of the embodiment of FIG. 5 taken along lines 6—6.

In FIGS. 5–7, there is shown a modified form which the laminations may take. Each lamination 60 is bounded or formed with a first straight edge surface 62 which serves as the entry surface for elemental object areas, a second straight edge surface 64 parallel with the edge surface 62 and serving as the exit surface, a curved convergent reflective edge surface 66 and a plano reflective edge surface 68. The laminations 60 are held in their respective positions by suitable tie rods 70 and are optically separated from one another by metallic foil 72. Instead of the foils 72, the laminations may be spaced by sputtered metallic coatings or other optical insulation on each side of a lamination.

As shown by the ray traces in FIG. 5, image forming light rays enter the edge surface 62 from an elemental object P on a master sheet 74. These rays impinge upon the curved edge surface 66, are reflected thereby and directed to the straight edge surface 68. The rays are reflected by the surface 68 and directed out the exit edge surface 64. The curvature of the reflective surface 66 is such that the image I of the object P will form at the surface 64 in order to be picked up by a sensitized sheet 76. As was the case for the embodiment of FIG. 1, transmission is effected by multiple internal reflections of the light rays by the internally reflecting surfaces on either side of the lamination and imaging is effected by the reflective edge surface 66.

To illuminate the object, a light source 78 is provided along one of the sides 80 of the optical element. A shield 82 serves to confine the light only to the lower end of the optical element so as not to, in any way, affect the image receiving sensitized sheet 76 adjacent the exit edge surface 64. Light from the source 78 will be transmitted through the adjacent side of the optical element and impinge upon the sheet 76 and thence be reflected upwardly in the form of image forming light rays which travel through the laminations as aforesaid. In order to minimize the amount of light lost by reflection by the side 80, there may be provide a glass plate having a flat surface cemented to the side 80 and a second side formed in steps 84 running lengthwise of the optical element. The steps 84 are provided with a surface generally normal to the light rays emanating from the source 78 for permitting more of these rays to enter the side 80.

The laminations 12 and 60 may have various relative dimensions and have any convenient index of refraction as long as they are optically correlated. A typical image transferring optical element of the embodiment of FIG. 1 may have the following specification:

```
Radius of curvature of the edge surface 14__mm. cyl__  201.37
Radius of curvature of the edge surface 16__mm. cyl__  201.37
Index of refraction of the laminations 12_____  1.489
Thickness of laminations 12_____mm__  0.10
Thickness of separators 44_____mm__  .02
Length of optical element 10 (in the direction
  of tie rods 17)_____mm__  261.7
Width of optical element 10 (as taken along
  the X-axis of FIG. 1)_____mm__  96.6
```

From the foregoing description, it will be appreciated that the present invention provides an image forming device which does not depend upon the ability of a master copy to transmit light therethrough. The text to be copied may be picked up by reflection directly from the surface of the master and, consequently, text printed upon opaque material may be thus copied. The present invention may be utilized in many present-day copying processes such as the diazo reaction and blueprinting processes, the silver halide process and in the practice of xerography. In the event the master sheet is transparent or translucent, the light source for each of the embodiments described above may be positioned behind the master as is the practice in the above-mentioned processes. While there is in this application specifically described a preferred embodiment and one modified embodiment which the invention may assume in practice, it will be understood that these forms are shown for purposes of illustration only, and that the same may be modified and embodied in various other forms or employed in other uses without departing from their spirit or the scope of the appended claims.

We claim:

1. An optical device for producing a light image comprising a plurality of relatively thin light transmitting sheet-like elements arranged in laminar relationship transmitting light edgewise through said elements, and means on the planar surfaces of said elements optically insulating said elements from each other, an object edge surface on each element, an image edge surface spaced from said object edge surface on each element, and an even number of internally reflecting edge portions optically in series between said object surface and said image surface, at least one of said reflecting edge portions being curved for imaging said object edge surface upon said image edge surface.

2. An optical device for producing a light image comprising a plurality of relatively thin light transmitting sheet-like elements arranged in laminar relationship, and means adjoining said elements optically insulating said elements from each other and collimating light transmitted through said elements, an object surface and an image surface on each of said elements, and reflective means in the optical path between said object surface and said image surface imaging said object surface upon said image surface by reflection, said device also including means directing light into said elements for internally illuminating said object surface thereof, and means shielding said image surface edge portions from direct rays emitted by said light directing means.

3. An optical device for producing a light image comprising a plurality of relatively thin light transmitting sheet-like elements arranged in laminar relationship, and means adjoining said elements optically insulating said elements from each other and collimating light transmission, an object surface on each of said elements, an image surface spaced from said object surface on each of said elements, and two internally concave reflecting edge portions symmetrically disposed along the optical path between said object surface and said image surface imaging said object surface upon said image surface.

4. An optical device for producing a light image comprising a plurality of relatively thin light transmitting sheet-like elements arranged in laminar relationship, and means intermediate said elements optically insulating said elements from each other and providing a number of parallel light transmitting paths equal to the number of elements, two confronting cylindrically curved edge portions concave with respect to each other on each element, diagonally opposite halves of said curved edge portions being internally reflecting, the other halves of said edge portions being transparent and constituting respective object and image surfaces, the spacing between said curved edge portions being such that said reflecting halves image said other halves upon each other in the dimension planes parallel to the planar surfaces of said elements, internal reflection in the dimension perpendicular to the planar surface being accomplished by collimation of the light due to optical insulation intermediate each of said elements.

References Cited in the file of this patent

UNITED STATES PATENTS

| | | |
|---|---|---|
| 942,589 | Salsbury | Dec. 7, 1909 |
| 1,687,119 | Benson et al. | Oct. 9, 1928 |
| 2,198,115 | John | Apr. 23, 1940 |
| 2,867,151 | Mandler | Jan. 6, 1959 |